US012328476B2

(12) United States Patent
Docherty et al.

(10) Patent No.: US 12,328,476 B2
(45) Date of Patent: Jun. 10, 2025

(54) CONTENT RECOMMENDATION SYSTEM AND METHOD

(71) Applicant: ThinkAnalytics Ltd., Glasgow (GB)

(72) Inventors: Peter Docherty, Glasgow (GB); Christopher McGuire, Glasgow (GB); Alan Ryman, Glasgow (GB); Shahad Ahmed, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 94 days.

(21) Appl. No.: 18/130,880

(22) Filed: Apr. 4, 2023

(65) Prior Publication Data

US 2024/0340498 A1 Oct. 10, 2024

(51) Int. Cl.

| | |
|---|---|
| ***H04N 21/466*** | (2011.01) |
| ***G06F 16/783*** | (2019.01) |
| ***H04N 21/45*** | (2011.01) |
| ***H04N 21/482*** | (2011.01) |

(52) U.S. Cl.

CPC ..... *H04N 21/4668* (2013.01); *G06F 16/7844* (2019.01); *H04N 21/4532* (2013.01); *H04N 21/4826* (2013.01)

(58) Field of Classification Search

CPC ............ G06F 16/7844; H04N 21/4532; H04N 21/4826; H04N 21/4668

See application file for complete search history.

(56) References Cited

U.S. PATENT DOCUMENTS

| | | | |
|---|---|---|---|
| 6,567,814 B1 | 5/2003 | Bankier et al. | |
| 7,805,129 B1 | 9/2010 | Issa et al. | |
| 9,661,364 B2 * | 5/2017 | Scheer | H04N 21/44226 |
| 9,699,491 B1 | 7/2017 | Docherty et al. | |
| 9,756,390 B1 | 9/2017 | Docherty et al. | |
| 9,906,837 B1 | 2/2018 | Docherty et al. | |
| 9,973,797 B1 | 5/2018 | Docherty et al. | |
| 10,091,555 B1 | 10/2018 | Docherty et al. | |
| 10,289,739 B1 | 5/2019 | Docherty et al. | |
| 10,356,035 B1 | 7/2019 | Gravino et al. | |
| 10,412,454 B2 | 9/2019 | Docherty et al. | |
| 11,212,584 B2 | 12/2021 | Docherty et al. | |
| 11,343,573 B2 | 5/2022 | Docherty et al. | |
| 2003/0106064 A1 | 6/2003 | Plourde | |
| 2007/0157222 A1 | 7/2007 | Cordray et al. | |
| 2008/0304812 A1 | 12/2008 | Jin | |

(Continued)

FOREIGN PATENT DOCUMENTS

| | | |
|---|---|---|
| EP | 1 317 143 A1 | 6/2003 |
| EP | 2 207 348 A2 | 7/2010 |

(Continued)

*Primary Examiner* — Ngoc K Vu

(74) *Attorney, Agent, or Firm* — Foley & Lardner LLP

(57) ABSTRACT

A computer-implemented method of providing one or more content item recommendations for a user of a content distribution system, the method comprising: obtaining metadata concerning items of content, the metadata representing at least some properties of the items of content; providing at least one subject related to the metadata to be available to the user for selection; using a selected subject selected by the user and metadata concerning content available from one or more content sources to generate at least one content item recommendation for the user, and providing the at least one content item recommendation to the user.

19 Claims, 6 Drawing Sheets

(56) References Cited

U.S. PATENT DOCUMENTS

| | | | | |
|---|---|---|---|---|
| 2010/0005492 | A1 | 1/2010 | Takano et al. | |
| 2010/0070507 | A1 | 3/2010 | Mori | |
| 2010/0287033 | A1* | 11/2010 | Mathur | G06F 16/9535 725/44 |
| 2011/0243529 | A1 | 10/2011 | Oryoji et al. | |
| 2014/0149344 | A1 | 5/2014 | Pudipeddi et al. | |
| 2014/0279756 | A1 | 9/2014 | Whitman | |
| 2015/0082330 | A1 | 3/2015 | Yun et al. | |
| 2015/0100987 | A1 | 4/2015 | Whitman et al. | |
| 2015/0269488 | A1 | 9/2015 | Galai et al. | |
| 2017/0311015 | A1 | 10/2017 | Docherty et al. | |
| 2020/0193552 | A1* | 6/2020 | Turkelson | G06F 18/24143 |
| 2020/0252690 | A1 | 8/2020 | Docherty et al. | |
| 2023/0362444 | A1* | 11/2023 | Lee | H04N 21/6582 |
| 2024/0169003 | A1* | 5/2024 | Grappin | G06F 16/9538 |

FOREIGN PATENT DOCUMENTS

| | | | |
|---|---|---|---|
| GB | 2 574 581 | A | 12/2019 |
| WO | WO-01/15449 | A1 | 3/2001 |
| WO | WO-02/27526 | A1 | 4/2002 |
| WO | WO-2008/042242 | A2 | 4/2008 |
| WO | WO-2013/130834 | A1 | 9/2013 |
| WO | WO-2013/186061 | A1 | 12/2013 |

* cited by examiner

CONTENT RECOMMENDATION SYSTEM AND METHOD

FIELD OF THE INVENTION

The present invention relates to a content recommendation system and method. More particularly, the present invention relates to recommending content relating to a subject selected by a user.

BACKGROUND OF THE INVENTION

Developments in technology, for example, the advent of digital television, internet enabled video-on-demand services and the availability of personal video recorders has led to consumers altering their viewing habits including how, where and when they consume video and other content. Furthermore, the amount of content that is available via many systems has expanded enormously.

In this context, during a viewing session, a viewer is faced with a very large choice of what to watch from a wide range of available content sources. Faced with such a large choice a viewer may view or otherwise consume content they are already familiar with rather than try something new.

The large choice of content and the increased variety of content sources has led to various technical developments to enable users to better access and select content, for example developments to electronic programme guides (EPGs). It is also known for viewers to filter the large choice of content using a search function. However, both approaches can result in viewers continuing to view content with which they are already familiar. Ultimately, this can lead viewers to become dissatisfied as they may feel they are not exploiting the system and range of content to the full. It can be frustrating and time consuming for a user to seek out suitable new content available from the wide range of choices available from TV and other content service providers. It has been suggested to provide viewers with content recommendations, which may lead them more rapidly to content that may be of interest.

SUMMARY

The following are provided as examples of the present disclosure.

According to a first example of the present disclosure is a computer-implemented method of providing one or more content item recommendations for a user of a content distribution system, the method comprising: obtaining metadata concerning items of content, the metadata representing at least some properties of the items of content; providing at least one subject related to the metadata to be available to the user for selection; using a selected subject selected by the user and metadata concerning content available from one or more content sources to generate at least one content item recommendation for the user, and providing the at least one content item recommendation to the user.

The method may further comprise providing a plurality of subjects to be available to the user for selection.

The method may further comprise at least one of: determining the at least one subject based on the metadata; and mapping the metadata to the at least one subject, wherein the at least one subject is predetermined.

The method may further comprise determining the at least one subject based on the metadata by at least one of: processing a plurality of features of the metadata and grouping these features into the at least one subject; applying a machine learning model to the plurality of features of the metadata, the machine learning model being configured to output the at least one subject based on the metadata.

The metadata concerning the items of content may be obtained from at least one of: the content, title, synopsis/short description, subtitles/closed caption text, full article text, other audio/visual data, textual data that has been converted from audio; and content that has at least one associated learn action for the user.

The metadata concerning the items of content may be obtained from a stored ontology. The stored ontology may include at least 10,000 features that can be used as metadata to represent items of content.

The ontology may include enriched versions of metadata obtained for items of content.

Generating the at least one content recommendation may comprise at least one of: identifying content available from the one or more content sources that includes the selected subject; mapping the at least one subject onto at least one feature of the metadata and then mapping the at least one feature of the metadata onto content available from the one or more content sources, and mapping the features of the at least one subject onto the features of the metadata of the content available from the one or more content sources, the features of the content having at least one associated weight.

The method may further comprise identifying the at least one subject within an item of content of the items of content.

The method may comprise identifying a plurality of subjects within an item of content.

Identifying the at least one subject within an item of content of the items of content may comprise at least one of: mapping the metadata of the item of content onto the at least one subject; mapping at least one feature of the metadata of the item of content onto at least one subject; and mapping the features of the metadata of the item of content onto the at least one subject, the features of the item of content having at least one associated weight.

The method may further comprise defining at least one part of the content within the item of content, wherein each part of the content may be distinct from another part or parts of the content with respect to the subject.

The at least one content recommendation may be for at least one of: the full content item which contains the selected subject and at least one part of the content which contains the selected subject.

The at least one subject may be at least one of: a feature and/or faceted feature of the metadata and a feature and/or faceted feature from a subset of features and/or faceted features of the metadata.

Providing the at least one subject to be available to the user for selection may comprise at least one of: providing the at least one subject for the user to subscribe to, providing a search function for the user to search for at least one subject and recommending at least one subject to the user.

Providing the search function may comprise providing at least one of: a ‘search by’ function for searching by the at least one subject to find relevant content and ‘navigate by’ function for searching by the at least one subject to provide a plurality of further subjects related to the at least one subject.

Recommending at least one subject to the user may be based on a user profile of the user and/or collaborative techniques.

The method may further comprise generating a plurality of content item recommendations for the user and providing the plurality of content item recommendations to the user.

The plurality of content recommendations may be are at least one of: separated by subject; comprising all of subjects selected by the user; ordered by how prevalent the subject is in the content; ordered by personalization; ordered by using other preferences of the user; ordered by popularity, ordered by using other features of the metadata that are in the content which are in the selected subject; and ordered by date.

The method may further comprise comprising indexing new content with the selected subject such that it is recommendable to the user and/or arranging content so that content that is no longer available to the user is not recommendable to the user.

Method steps of the invention can be performed by one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customized circuitry. Processors suitable for the execution of a computer program include central processing units (CPUs), graphics processing units (GPUs), Tensor Processing Units (TPUs), maths-co-processors and microprocessors, and any one or more processors. The processors may be single core or multi-core. Generally, a processor will receive instructions and data from a read-only memory or a random access memory or both. The essential elements of a computer are a processor for executing instructions and one or more memory devices for storing instructions and data. The processor may be provided as part of a cloud computing resource, which is network connected and may comprise one or more computer systems, such as servers, and one or more data storage devices. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

According to a second example of the present disclosure is a system comprising processing circuitry configured to: obtain metadata concerning items of content, the metadata representing at least some properties of the items of content; provide at least one subject related to the metadata to be available to the user for selection; use a selected subject selected by the user and metadata concerning content available from one or more content sources to generate at least one content item recommendation for the user, and provide the at least one content item recommendation to the user.

The system may comprise middleware or a computer system configured to provide services to a provider of a user content selection interface. The user content selection interface may be provided by a computer system of the provider or on behalf of the provider. The provider may be the provider of content, such as but not limited to a television channel. The middleware or intervening computer system may be a cloud based system. The middleware or intervening computer system may be a network connected computer system and may be configured to communicate with one or both of: the computer system of the provider and/or the user devices over the network. In other examples, the system is comprised in a computer system of a provider, i.e. of a content provider. The system may be a distributed computer system or may be a unitary computer system.

The system may be configured to implement at least part or all of the method of the first example. The system may comprise a device, such as a cloud computing resource or other network enabled device, comprising or configured to implement the system of the second example. The controller or processing system may be implemented by a suitable program or application running on the device. The device may comprise at least one processor, such as a central processing unit (CPU), maths co-processor (MCP), graphics processing unit (GPU), tensor processing unit (TPU) and/or the like. The at least one processor may be a single core or multicore processor. The device may comprise memory and/or other data storage, which may be implemented on DRAM (dynamic random access memory), SSD (solid state drive), HDD (hard disk drive) or other suitable magnetic, optical and/or electronic memory device. The at least one processor and/or the memory and/or data storage may be arranged locally, e.g. provided in a single device or in multiple devices in in communication at a single location or may be distributed over several local and/or remote devices. The device may comprise a communications module, e.g. a wireless and/or wired communications module. The communications module may be configured to communicate over a cellular communications network, Wi-Fi, Bluetooth, ZigBee, near field communications (NFC), IR, satellite communications, other internet enabling networks and/or the like. The communications module may be configured to communicate via Ethernet or other wired network or connections, via a telecommunications network such as a POTS, PSTN, DSL, ADSL, optical carrier line, and/or ISDN link or network and/or the like, via the cloud and/or via the internet, or other suitable data carrying network. The communications module may be configured to communicate via optical communications such as optical wireless communications (OWC), optical free space communications or Li-Fi or via optical fibers and/or the like. The device and/or the controller or the at least one processor or processing unit may be configured to communicate with the remote server or data store via the communications module. The controller or processing unit may comprise or be implemented using the at least one processor, the memory and/or other data storage and/or the communications module of the device.

According to a third example of the present disclosure is a non-transitory computer-readable medium that comprises computer-readable instructions that are executable to provide one or more content item recommendations for a user of a content distribution system, the provision comprising: obtaining metadata concerning items of content, the metadata representing at least some properties of the items of content; providing at least one subject related to the metadata to be available to the user for selection; using a selected subject selected by the user and metadata concerning content available from one or more content sources to generate at least one content item recommendation for the user, and providing the at least one content item recommendation to the user.

The individual features and/or combinations of features defined above in accordance with any aspect of the present invention or below in relation to any specific embodiment of the invention may be utilized, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE DRAWINGS

Various aspects of the invention will now be described by way of example only, and with reference to the accompanying drawings, of which.

DETAILED DESCRIPTION

In TV systems, or other systems for provision of content to a user, each service provider may have thousand, tens or hundreds of thousands, or millions of customers, wherein each customer is unique and may have different viewing habits and preferences. It has been recognised that each may require different content recommendations. Furthermore, in order to accommodate the range of tastes and interests of such a large customer base, and to keep those customer's interest, the service provider will often provide an extensive range of different content. However, the sheer volume of content available from service provider systems can present difficulties in identifying content that the user would like to access and view. The content available to a user can be stored in a content database of a service provider, but if a user cannot readily identify content of interest, then the user may get frustrated or may not fully realize the beneficial content available to them. As such, systems for allowing users to better identify the content available from a content provider would be beneficial.

Tracking, recording and processing large volumes of customer data together with large amounts of content data in order to provide a personalised recommendation within the time constraints demanded by a viewer and by the system poses a significant technical challenge. The time constraints demanded by particular content providers, or expected by users, for provision of recommendations may be particularly demanding, with content recommendations being required to be generated almost instantaneously, for example within a few hundred milliseconds of a user switching on a set top box or otherwise beginning a viewing session. This can present a significant technical challenge, particularly as the content recommendation system is usually hosted on a server remote from the set top box and, for systems with millions of subscribers, may have to deal simultaneously with millions of content recommendation demands per minute during busy periods.

Figure 1:
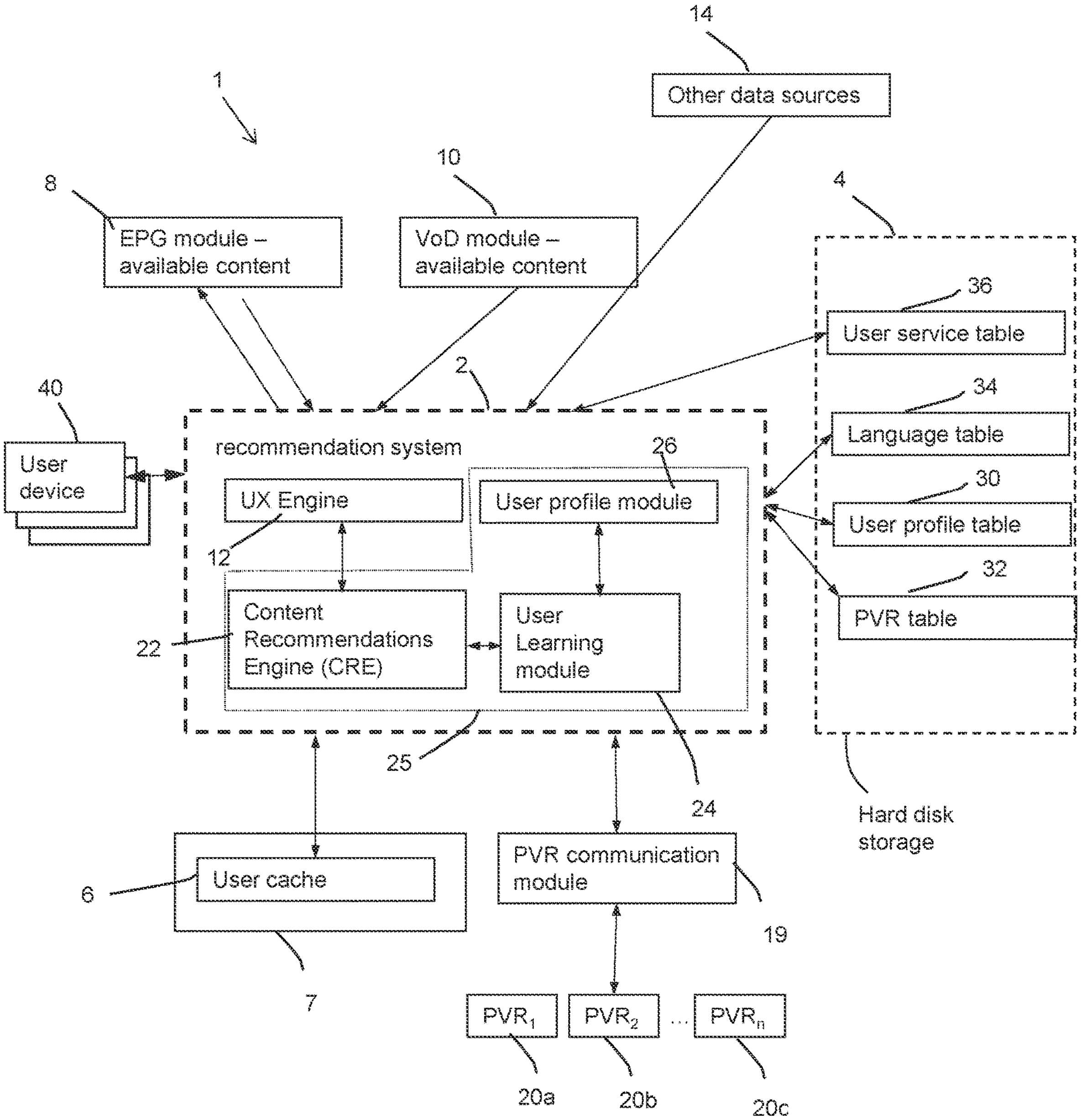
FIG. 1 is a schematic diagram of a content recommendation system.
Figure 2:
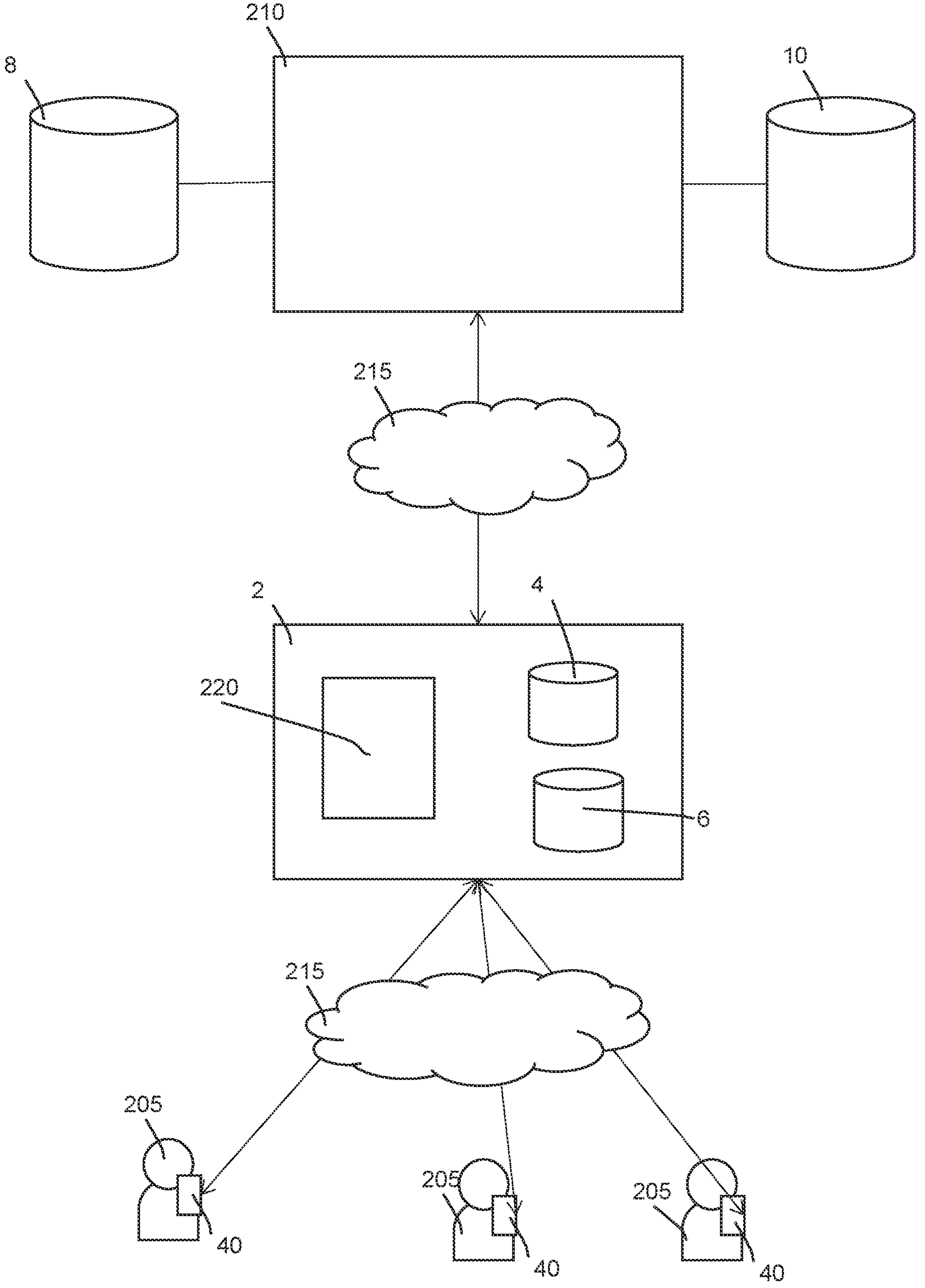
FIG. 2 is a simplified schematic of the system of FIG. 1.
Figure 3:
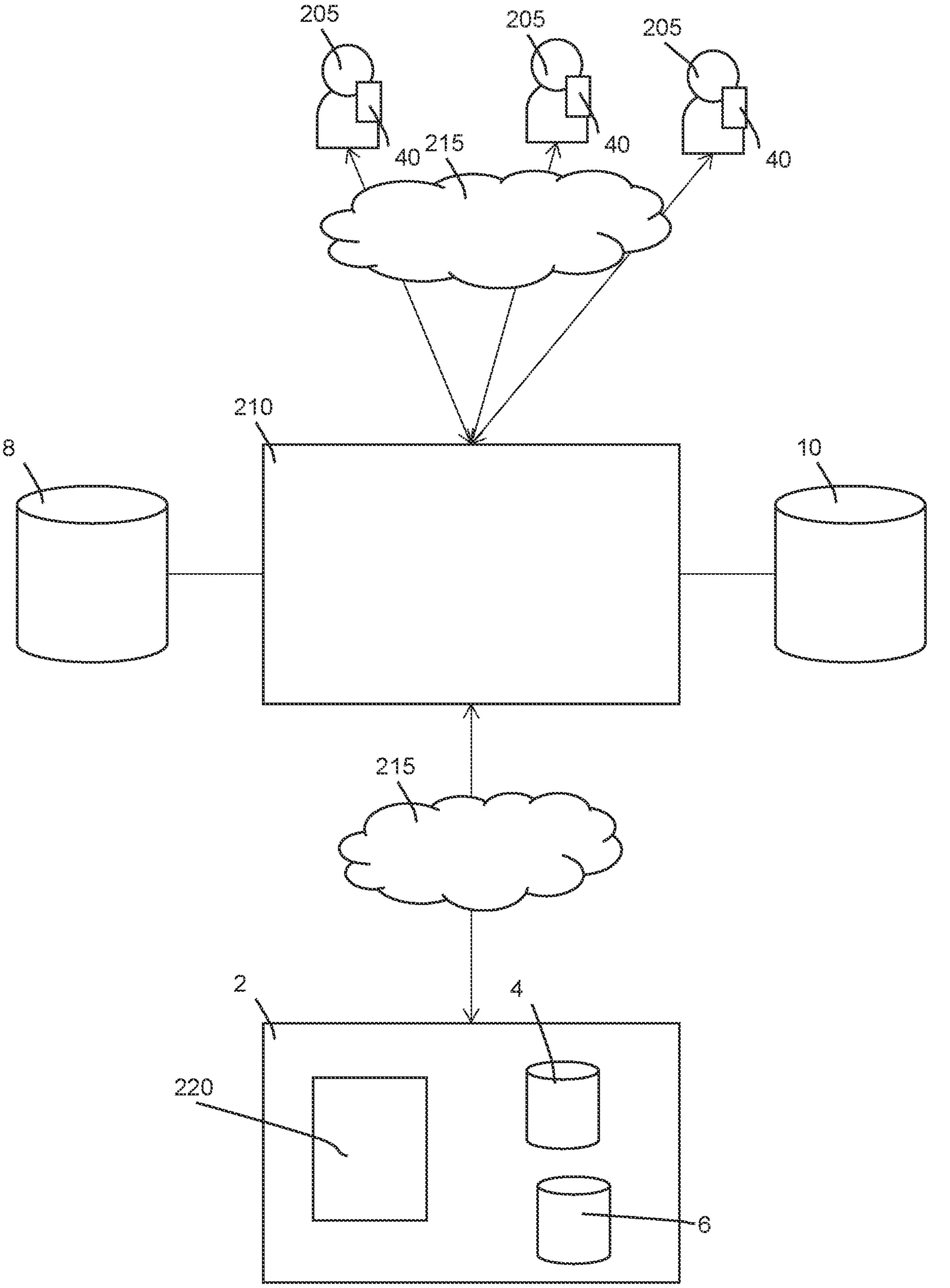
FIG. 3 is a simplified schematic of an alternative system arrangement to that of FIG. 2.

FIG. 1 shows a schematic diagram of a system 1 that comprises a user experience (UX) engine 12 for providing a user subject selection interface that allow users 205 (see FIGS. 2 and 3) to be provided with a subject (which may also be referred to as a topic) and select a subject which will allow recommendations to content from a content service provider (210, also shown in FIGS. 2 and 3). In particular, the user experience (UX) engine 12 can be used to provide customized user subject selection interfaces that are customized or otherwise specifically configured to a specific user 205 or group of users 205. The customization comprises customizing the subjects which are presented to a user, and provides an interface in which the user may select subjects of interest. The selected subject or subjects of interest may be used to provide customized user content recommendations that are customized or otherwise specifically configured dependent on the subject or subjects selected by the user. Thus, content that is more likely to be of interest to the user 205 may be presented, e.g. in preference to content that may be less likely to be of interest to that user 205.

In the example of FIG. 1, the user experience (UX) engine 12 is provided as part of a more general recommendation system 2 that comprises a content recommendation engine (CRE) 22 that can apply a set of processes to determine, in real time, content recommendations for a user 205 based on user data and available content. This arrangement can be beneficial as there may be some cross-over in the data utilized such that the UX engine 12 can in some examples share or otherwise leverage data used by the CRE 22, which can minimize data storage and other services required to operate both systems. However, the disclosure is not limited to this arrangement and in other examples the UX engine 12 can be provided as a dedicated stand-alone system or as part of a content provider's user interface system or in another suitable component of a content provision system or associated support system.

The content recommendation engine (CRE) 22 in this example may be provided as part of an affinity profile generation system, which is operable to generate affinity profiles for users 205 based on first party data in the form of, for example, user actions performed in relation to their selection, viewing and other actions in relation to TV content provided by a TV distribution system, and/or in relation to other content. The recommendation system 2 in the embodiment of FIG. 1 may be able to generate affinity profiles as well as being able to provide content recommendations to users. Content recommendations may be provided in real time or near real time for tens of thousands, hundreds of thousands, or even millions of users, for example using techniques as described in UK Patent No. GB 2574581 or U.S. Pat. No. 11,343,573, the content of each of which is incorporated herein by reference. However, as noted above, this is an optional arrangement, and the UX engine 12 need not be provided as part of such a recommendation system 2 and can be provided as a stand-alone system or as part of a system with other functionality.

Some example modes of operation are described below in relation to PVRs associated with users, but content may be provided or accessible via any suitable devices, for example set-top boxes, smartphones, PCs or tablets or any other suitable content delivery mechanism.

As noted above, the system 1 in the embodiment of FIG. 1 comprises the recommendation system 2 that includes the content recommendation engine (CRE) 22, the UX engine 12 and a user profile module 26, each of which is linked to a first storage resource in the form of a hard disk storage device 4, which is used to store various user data, including user actions. The recommendation system 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a user session.

As discussed further below, recommendation system 2 is able to communicate, either directly or indirectly, and either via wired or wireless connection, with very large numbers of users 205 or user devices 40 and to provide recommendations for or derived from such users 205 or their user devices 40. Other than some PVRs which are shown schematically in FIG. 1, only a few user devices 40 are shown in FIG. 1 for clarity, but it will be appreciated that more or less user devices 40 could be present. The user devices 40 could include, as examples only, a user's mobile phone, smart TV, tablet computer, laptop, smart watch or other suitable viewing device. Although the user devices 40 could belonging to the user 205, they could also comprise any other device that the user 205 is logged into.

The recommendation system 2, and specifically the CRE 22, the UX engine 12 and the user profile module 26 are also linked to sources of information concerning available content, in this case an EPG module 8 and a Video-on-Demand (VoD) module 10 which provide information about content available to a user 205 from a service provider system 210 (see FIGS. 2 and 3) via an EPG (for example, scheduled TV programs on a set of channels) and via a VoD service. In alternative embodiments, a variety of other sources of content may be available as well as, or in addition to, EPG and VoD content, for example internet content and/or any suitable streamed content via wired or wireless connection. The EPG is provided as an example of a content selection interface that allows users 205 to look for content available from the service provider and to select content, e.g. for download, streaming and/or viewing. However, the present disclosure is not limited to EPGs and could also be applied to other content selection interfaces, e.g. for music provision services, audio book services, film streaming services, creator content, book or article selection interfaces, amongst others. The content may comprise video, audio, text, images, or other data.

In the embodiment of FIG. 1, the EPG module 8, the UX engine 12, the user profile module 26, the VoD module 10, the CRE 22, the user cache 6, a PVR communication module 19, and a user learning module 24 are implemented in a server. The server includes communication circuitry that enables communication between the server, or appropriate components of the server, with each of the user devices 40, and with the content sources, for example a TV service operator or other content service operator. However, other arrangements are possible, e.g. one or more of the above components may be distributed over other system or more generally in the cloud.

Any other suitable implementation of the EPG module 8, the VoD module 10, the UX engine 12, the user profile module 26, the content recommendation engine (CRE) 22, the user cache 6, the PVR communication module 19, and the user learning module 24 may be provided in alternative embodiments, for example they may be implemented in any software, hardware or any suitable combination of software and hardware. Furthermore, in alternative embodiments any one of the components described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example a TV service operator or other content service operator. The content information comprises metadata of content, for example, television program metadata. The metadata may be representative of a variety of different content parameters or properties, for example but not limited to program title, time, duration, content type, program categorization, actor names, genre, release date, episode number, series number. It is a feature of the embodiment that the metadata stored at the EPG module 8 and the VOD module 10 may also be enriched with additional metadata, for example by the operator of the system, such that additional metadata to that provided by the content sources or other external sources may be stored.

In the embodiment of FIG. 1 the system 1 operates together with three sources of content for a user device 40: real-time linear television, for example terrestrial or satellite broadcast television; one or more video-on-demand (VOD) services, and pre-recorded video content stored on one or more personal video recorders (PVR). In alternative embodiments further sources of content as well as or instead of those shown may be used.

The operation of the system 1 is controlled by the recommendation system 2. As can be seen in FIG. 1, the recommendation system 2 is configured to communicate with the one or more content information modules such as the electronic program guide (EPG) module and VoD module 10. The recommendation system 2 is also configured to communicate with the user cache 6 local to the recommendation system 2, the hard disk storage resource 4 and the one or more PVRs. A data access layer provides a communication interface between the recommendation system 2 and the hard disk storage resource 4. The personal video recorder (PVR) communication module 19 provides a communication interface between the one or more PVRs 20*a*, 20*b*, . . . 20*z* and the recommendation system 2.

The PVR communication module 19 of FIG. 1 is an interface between the PVRs 20*a*, 20*b*, . . . 20*z* and the affinity profile and recommendation system 2. The recommendation system 2 collects identifying information relating to the content items stored on the PVRs 20*a*, 20*b*, . . . 20*z*. Content items from the PVR of the user can then be taken into consideration in generating content recommendations.

In alternative embodiments any other data stores, for instance local storage devices, for example any storage devices included in or associated with user devices, may be used as well as or instead of PVRs. In some embodiments the data stores may comprise data stores forming part of a cloud storage system or other remote and/or networked and/or virtual storage system. Furthermore, the items of content in question are not limited to comprising video content and may comprise any suitable type of content, for example audio content, image content, virtual reality content or augmented reality content.

There is description above concerning metadata or other content information that may be used by the system. Content information may, for example, include contain scheduling information (e.g. start and end times for programmes, series information) together with content information regarding the programme itself (e.g. programme description, age rating information).

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as equivalent to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

The user profile module 26 is operable to use first party data obtained by an operator of the system to determine user activity profiles of individual users 205 or sets of users 205, which are representative of actions of a user 205.

The content recommendation engine (CRE) 22 can apply a set of processes to determine, in real time, content recommendations for a user 205 based on user data and available content.

The user learning module 24 receives data indicative of selections or other actions by a user 205 and builds up a set of user data, for example comprising or representing a user history or profile, which is stored in the hard disk storage 4, and which is used in generating personalized recommendations for the user 205.

The UX engine 12 allows for the user subject selection interface to be configured, which may be at least in part responsive to input from an operative, such as an operative of a content provider service, and/or at least in part automatically, or any combination thereof.

The provision of subjects (and content recommendations in examples in which the UX engine 12 is part of a recommendation system 2) can be based on user actions, wherein at least some of those user actions include user interaction with content recommendation user interfaces. FIG. 1 shows user actions and requests for recommendations or ordering of content being communicated directly to the recommendation system 2 from the user devices 40. In addition to receiving requests for recommendations of content or ordering of groups of content, the recommendation system 2 is configured to log user activity. By logging user activity and storing activity over an extended period of time, the recommendation system 2 and the hard disk storage 4 can build up an overall picture of the actions of a plurality of users relating to their interactions with content selection interfaces. User actions are turned into learn actions by the user learning module 24 to be processed by the user profile module 26, the UX engine 12 and the content recommendation engine (CRE) 22.

The system of FIG. 1 is configured to operate with a plurality of user devices 40 each associated with at least one user 205 (e.g. belonging to the user 205 or into which the user 205 is logged in). The plurality of user devices 40 may comprise a large number of devices 40, for example thousands, tens or hundreds of thousands, or even millions of devices 40. Each user device 40 may be any device or combination of devices that is configured to enable a user to view or otherwise consume content. For example, each user device 40 may be an internet-enabled device and/or a device for providing video or other content on demand and/or a device capable of receiving a real-time linear television broadcast signal. The user device 40 may be a mobile device, for example a tablet, a smart phone or a laptop. Alternatively, the user device 40 may not be mobile, for example, an internet browser enabled computing device, a smart television or a set-top box. The user device 40 may also have an in-built or associated PVR for recording and storing content in some embodiments.

The user 205 may be a viewer of the user device 40. Alternatively or additionally, the user 205 may be a subscriber and/or customer of a service accessible through the user device 40.

The user cache 6 is coupled to the user profile module 26, the UX engine 12 and the content recommendations engine (CRE) 22, and data stored by the user cache 6 may be used by the user profile module 26, the UX engine 12 and the content recommendations engine 22. The recommendation system 2 can access data stored on the user cache 6. The user cache 6 may be provided in random access memory (RAM) 7.

The hard disk storage 4 is communicatively coupled to the recommendation system 2. The hard disk storage 4 stores data for use by the recommendation system 2, including user actions, also referred to as user activity. The hard disk storage 4 is configured to store one or more databases. Entries from the databases on the hard disk storage resource 4 can be retrieved by requests made through a data access layer. Entries in the databases may also be updated via the data access layer.

The database(s) at the hard disk storage 4 store user data that is used by the user profile module 26 to generate and update user profiles for users 205. That data can be used by the content recommendation engine (CRE) 22 to generate recommendations for content for the specific user 205 and/or can be used by the UX engine 12 to prepare subjects for presentation on the subject selection interface. In the embodiment of FIG. 1 a set of database tables is provided that store information concerning the users 205.

In the embodiment of FIG. 1, the tables may include at least one user service table 36 that represents user service requirements, and at least one user profile table 30 that includes user attribute data that may be included in a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user, the gender of the user and/or the like.

In the embodiment of FIG. 1, the tables may include various user learning tables that include data representing user 205 actions, also referred to as user activity. Examples of user 205 actions that constitute user activity that can be collected include one or more or each of: selecting content from a group of content or a related group of content; scrolling through content in a group of content or a related group of content; hovering a cursor for greater than a threshold period over a group of content or a related group of content; pausing scrolling for greater than a threshold period through groups of content whilst a group of content or a related group of content is displayed on a user interface; downloading content that is in a group of content or related group of content; having watched at least part of content that is in a group of content or related group of content; bookmarking content that is in a group of content or related group of content; browsing content that is in a group of content or related group of content; recording content that is in a group of content or related group of content; adding content that is in a group of content or related group of content to virtual shopping basket or otherwise selecting for purchase or potential purchase; watching or listening to a trailer for content that is in a group of content or related group of content; playing content that is in a group of content or related group of content on a user device; purchasing content that is in a group of content or related group of content; clicking on or otherwise selecting content that is in a group of content or related group of content from a list of search results; remotely recording content that is in a group of content or related group of content; setting a reminder for content that is in a group of content or related group of content; liking, making a favorite or otherwise adding to a list content that is in a group of content or related group of content; disliking content that is in a group of content or related group of content; messaging about content that is in a group of content or related group of content; posting on social media about content that is in a group of content or related group of content; playing purchased content that is in a group of content or related group of content; stopping watching or playing content that is in a group of content or related group of content; and/or rating content that is in a group of content or related group of content, from amongst others.

For example, if a user 205 selects a program or other item of content from a content selection interface and views or otherwise consumes it for greater than a threshold period of time then a learn action is generated and at least one user data item for that user is stored in at least one of the tables. The data item may include various data including for example start and stop viewing time, time slot identifier, program identifier, which group of content the content belongs, at least some metadata concerning the program (although such metadata may be stored separately as content data rather than user data in some embodiments, and linked to or otherwise accessed if required, for example by the program name or other identifier). The user learning module 24 determines whether user data should be stored in the tables in respect of a particular user action or set of actions. For example, if a user only views a program for a very short period of time, for instance if they are channel surfing, then user data is optionally not stored in the user learning tables in respect of that action. User data can be stored in respect of a variety of different user actions or events, for example selecting, viewing, recording or searching for content or any of those listed above or others that would be apparent to a skilled person.

In the embodiment of FIG. 1 a large part of the user data comprises user history or user action data that represent user actions over a significant period of time. In various embodiments, there is a limit to how long user data is kept or used. For example in the embodiment of FIG. 1 after a threshold period, for example six months after being collected, items of user data are deleted. Thus, in some embodiments the user data for a particular user 205 may include only relatively recent user action data, although the amounts of data may still be substantial.

Although a particular system arrangement is shown in FIG. 1, there are various system arrangements that could be used.

FIG. 2 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205, such as but not limited to actions taken by the user 205 during operation of the content selection interface, including one or more of the user actions listed above. The user devices 40 also provide a user ID that can be used to identify the user 205 to allow the provision of a subject selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a subject selection interface for the user 205. The recommendation system 2 can communicate the requests and other data from the user devices 40 to the content providers systems 210 in order to provide the content to the user devices 40.

Other system arrangements that provide similar functionality to customize the content selection interfaces for users are possible. FIG. 3 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the subject selection interface for that user. The recommendation system 2 provides the data for customizing the subject selection interface for that user and how the content recommendations will be provided to the user, including an ordering with which to present recommended content based on the subject or subjects, to the systems of a content provider 210 for providing for that user 205.

Figure 4:
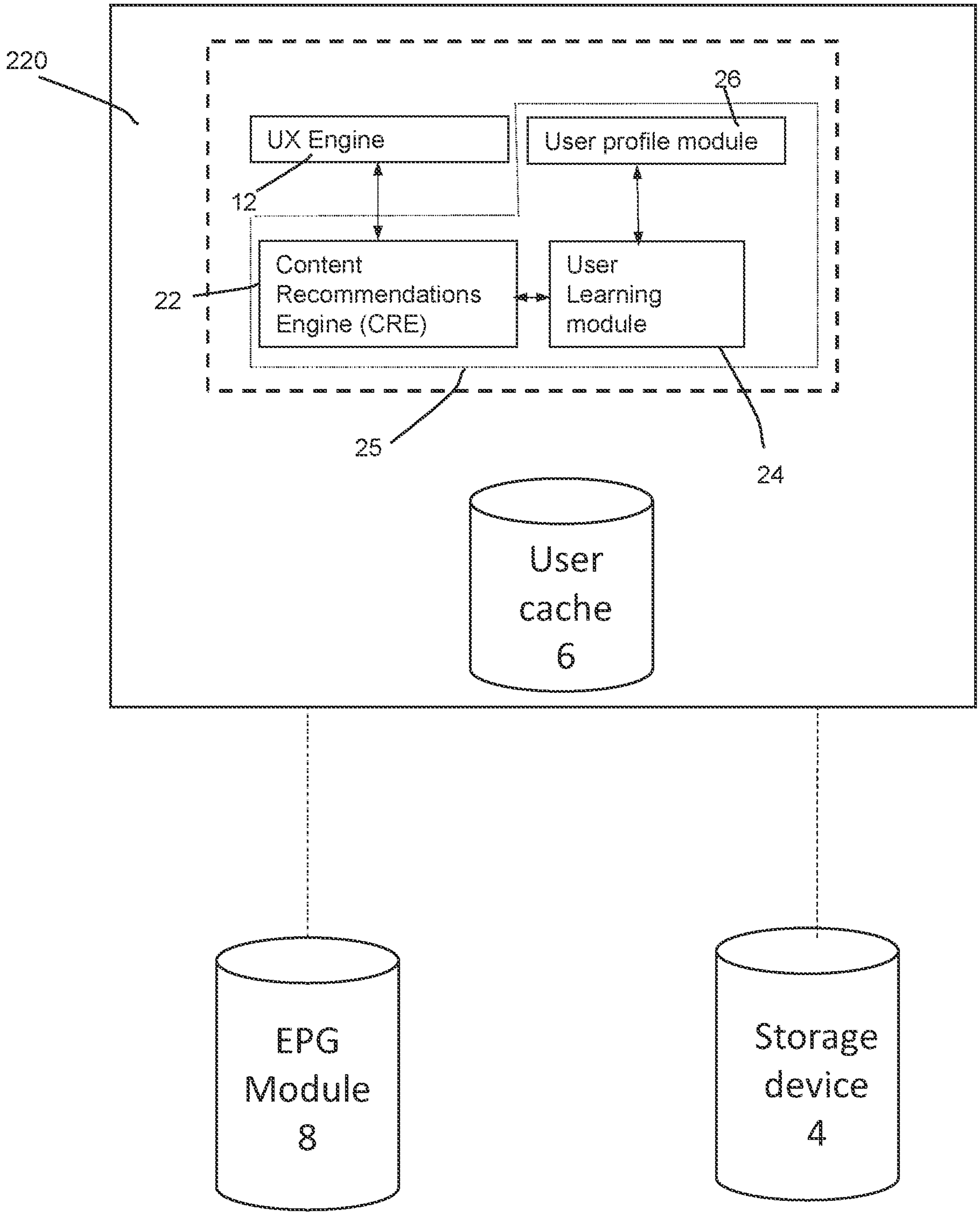
FIG. 4 is a schematic of a system for for providing a content recommendation.

FIG. 4 shows an arrangement of processing resource 220 for implementing the recommendation system 2, including the UX engine 12 and in some examples also a recommendation service 25 that includes the CRE 22, the user learning module 24 and the user profile module 26. The processing resource can optionally comprise one or more processors, FPGAs, ASICS or the like, which may be provided in a single machine or distributed over a plurality of machines, and may be locally arranged or remote from each other and connected over a network. The processing resource 220 is configured to communicate with content databases, such as the EPG module 8, to retrieve content available from the content provider. The processing resource 220 comprises rapid access storage, such as user cache 6, which may be implemented in RAM or SSD storage to provide fast access to user profiles and actions that the processing resource is currently, and will next be, performing operations on. The processing resource is also configured to communicate with external storage such as storage device 4 on which user actions and profiles are stored and can be retrieved into the use cache 6 when needed by the processing resource 220. The UX engine 12 can be accessed by the operatives of the content provider (or other suitable users) to configure the subject selection interface provided to user devices 40 for identifying relevant content available from the content provider.

As mentioned above, the UX engine 12 provides a subject or subjects to the user for selection in the subject selection interface. These subjects are related to metadata of the content. In particular, metadata concerning items of content, the metadata representing at least some properties of the items of content. In the situation where a plurality of subjects are provided or presented to the user for selection, the plurality of subjects may be provided in a list, or any other form, that a user can navigate and choose their preferred subject. The subject selection interface may form part of a content selection interface (e.g. a customized content selection interface) or may be a separate interface for the user to make their subject selection.

In embodiments, the subject may be considered to be higher level than lower level features of metadata of the content. For example, the subject may be based on various categories or facets of the content such as: people (e.g. actor, director, celebrity etc), characters, mood, subject, theme, sport, team, franchise, location, etc). It will be appreciated that this list is not exhaustive and there may be many other features of metadata.

As mentioned, metadata of content may include a variety of different properties. These may include, e.g. title and synopsis. This metadata may be provided from the content service provider. In embodiments, a search may be performed of various data sources, for example in the cloud, to determine any other information concerning the item of content. For example, various databases can be consulted that include additional information concerning television programmes or other items of content.

In embodiments, the record for the item of content and any other information found from the search of data sources may be subject to processing by a sub-module that match the metadata and other information for the item of content to an ontology of meta data terms that are maintained by the system. Thus, the meta data for the item of content can be enriched, corrected or supplemented.

In the present embodiment the ontology consists of around 38,000 features that can be used as meta data to represent items of content. In other embodiments, it may be a different number of features (e.g. 10,000). The ontology defines features in the format <context>:<keyword>. This may be considered to be a faceted feature. Features describe the content and include subjects, settings, themes and characters (for example, Wimbledon may contain the terms-subject: tennis, sports competition: Wimbledon, theme: sports). Any other suitable ontology can be used in other embodiments. In some embodiments, no ontology is used and the raw metadata associated with the item of content (for example, provided by the content maker, distributor or broadcaster) is used without amendment or enrichment.

Although, in embodiments, the subject may be considered to be higher level than the features of the metadata, in some embodiments, the subject may be a feature and/or faceted feature of the metadata. Furthermore, the subject may be a feature and/or faceted feature from a subset of features and/or faceted features of the metadata. This subset of features and/or faceted features of the metadata may contain features that are deemed to be particularly suitable as subjects. For example, Sharks may be a subject. Faceted features may be useful to disambiguate the features of the metadata. Examples may be team: Chelsea F.C, location: Chelsea F.C. In embodiments, there may be a plurality of features of the metadata in a subject., e.g. 20-30 features in the subject America. It will be understood that subject may be a feature in the metadata and the subject that is being provided to the user may be one of these subjects in the metadata but may also be a different, or even more high level subject.

Figure 5:
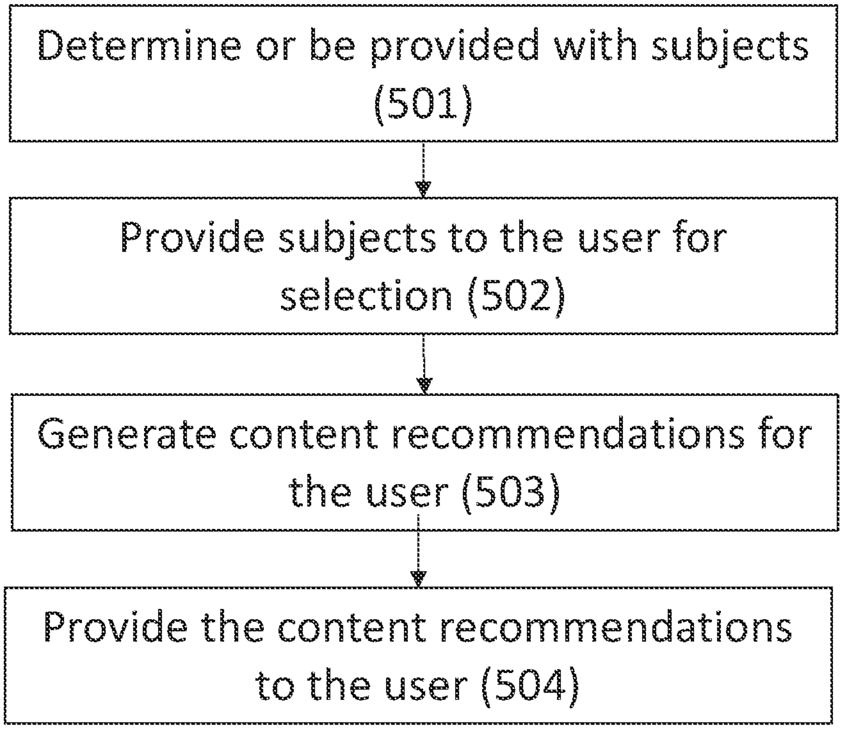
FIG. 5 is a flow chart of a method of recommending content using a subject selected by the user.

FIG. 5 give examples of methods of operation of the UX engine 12 and content recommendation engine (CRE) 22 to provide content recommendations (e.g. automatically) to the user based on the subject selected by the user.

In step 501, subjects are determined by or provided to the UX engine 12. These subjects may be determined through computational methods or may be manually selected, e.g. by an operator of the content service provider. The subjects may be customized for a particular user or may be more generic, e.g. for providing to a plurality of users. These subjects are related to the metadata.

In step 502, the subjects related to the metadata are provided to the user to be available for selection in the subject selection interface.

It will be appreciated that providing the subjects to be available to the user for selection includes providing the subject to the user for the user to subscribe to the subject. Subscribing to a subject means that the user can provide an indication that they are interested in receiving ongoing content related to this subject and they can then be recommended content related to this subject (e.g. automatically and/or in an ongoing manner).

It will also be appreciated that providing the subjects to be available to the user for selection includes the provision of a search function for a user to search for a subject. Once the user has searched for this subject (e.g. using a text or voice search), and found it, the user can then select or subscribe to the subject. A 'search by' function may be provided for searching by the subject to find relevant content. For example, a user may search for subject "Sharks" to find relevant content related to sharks. In addition a 'navigate by' function may be provided for searching by the subject to provide a plurality of further subjects related to the subject. The further subjects may be then be browsed by the user and then the user can select or subscribe to one or more of the further subjects. For example, a user may search for "Planet Earth" which then displays a list of key further subjects related to Planet Earth, e.g.: "Nature", "Ocean", "Sharks", "David Attenborough". The user can browse these further subjects and/or browse programs related to these further subjects and then select these programs if desired.

It will also be appreciated that providing the subjects to be available to the user for selection includes recommending a subject to the user.

The recommendation of the subject may be based on a user profile of the user. The user profile may contain information relating to user interactions. Beneficially, such user interactions may comprise first party data in the form of, for example, user actions performed in relation to their selection, viewing and other actions in relation to content such as but not limited to TV content provided by a TV distribution system or other types of content. The user profile may include e.g. features of metadata from content the user has watched and/or from content that the user has indicated that they prefer/like/given a high rating. Thus, using the information from the user profile, the UX engine 12 can provide subjects to a user that they are likely to be interested in subscribing to as it is based on content they have already watched and/or interacted with.

Subjects may be recommended to users in a particular order based on the user profile. In embodiments, the method may comprise recommending subjects dependent on features in the subjects being in the user profile and dependent on the weights associated with those features in the user profile. For example, if a subject has a (mapped) feature that is in the user profile with a relatively high weight (e.g. an indication that that feature is important to that user) or there are several features common to the user profile and the subject, then this subject may be recommended to the user. It will be understood that there may be many subjects that have (mapped) features in common with the user profile and these features may have different weights associated with them. Thus, an (automatic) determination is made on which are the most suitable subjects to recommend to the user, and in which order, based on the (mapped) features in the subject and the features and associated weights in the user profile.

The recommendation of the subject may be based on collaborative techniques. Collaborative techniques take into account user profiles and/or preferences of other users that are related or have similarities to the user. For example, if another user has watched the same film as the user, then the user may be suggested a subject that the other user has subscribed to. This allows users to be recommended with subjects that they are potentially likely to be interested in, but this may also mean they are more likely to find content that they are not familiar with.

In step 503, the subject or subjects selected by the user are used with metadata concerning content available from one or more content sources (e.g. in a content database of service provider) to generate the content recommendations for the user in the content recommendation engine (CRE) 22. The content available from the one or more content sources (e.g. a content database) is available for the user to watch or otherwise consume.

In step 504, the content recommendations are provided to the user.

Figure 6:
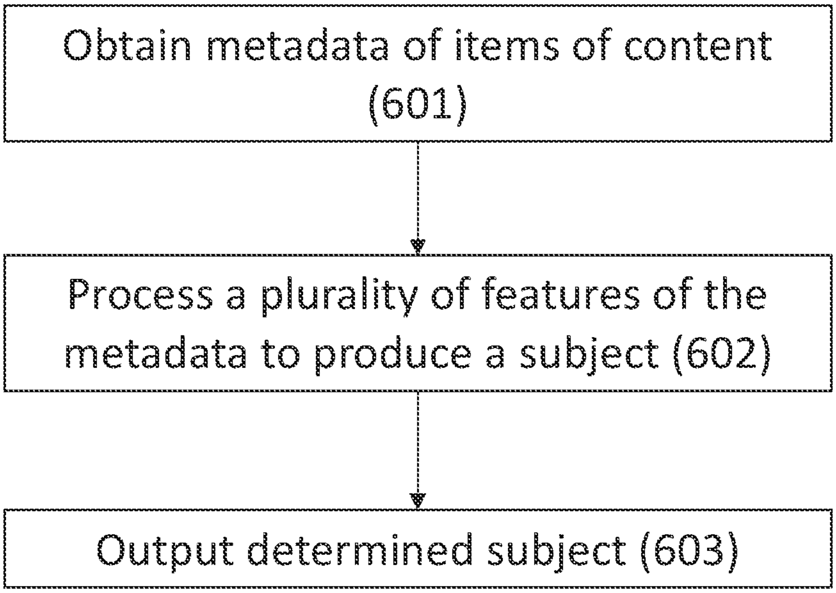
FIG. 6 is a flow chart of a method of determining a subject for the user.

FIG. 6 gives examples of methods of operation of the UX engine 12 to (e.g. automatically) determine subjects for the user. It will be appreciated that, in other embodiments, this may be carried out in a separate module or sub-module to the UX engine 12.

In step 601, metadata is obtained concerning items of content, the metadata representing at least some properties of the items of content. In examples, the metadata concerning the items of content is obtained from general content, e.g. content that may be stored in a content database. The database may be unrelated to the user and/or unrelated to the particular content service provider that the user has subscribed to. The content database may contain items of content from a number of content service providers and/or other sources of content. In other examples, the content is related to the user in some way. In embodiments, the metadata may be obtained from data related to the content such as title, synopsis/short description, subtitles/closed caption text, full article text, other audio/visual data, textual data that has been converted from audio. In embodiments, the metadata may be obtained from content that has at least one associated learn action for the user. For example, the learn action may indicate that the user has watched the content and/or has provided a rating for this content.

In step 602, a plurality of features of the metadata are processed by the UX engine 12 and these features are grouped together in order to produce a subject. As an example, the subject may be "Cost of living crisis" and the features may be utility bills, debt counselling, fuel poverty, inflation, RPI, CPI, and money saving advice. In examples, this may involve mapping the subject onto the features of the metadata. In some examples, determining the subject based on the metadata for presentation to the user on the subject selection interface can comprise determining the subject using a machine learning module based at least in part on the metadata. In this case, the UX engine 12 comprises or has access to a machine learning module. For example, the machine learning module may implement at least one machine learning model that has been trained on training data or otherwise configured to transform inputs that include at least the metadata and optionally also context or other data, and to output the at least one subject based on the metadata. The machine learning model may be applied to the features of the metadata and the machine learning model may be configured to output the at least one subject based on the metadata. As examples, the machine learning model may comprise a KMeans, Kohonen, or Naïve Bayes machine learning model. The machine learning model may use clustering. The machine learning method may determine features commonly occurring together in content and group (e.g. cluster) these features into at least one subject. The machine learning model may be a supervised or unsupervised learning model. In examples, the machine learning model may have been trained on training data that comprises known subjects and features of subjects which correspond to features of metadata and a score, the score indicating how relevant the subject is for these features. In examples, the machine learning model is updated or trained based on user feedback. For example, the user may be invited to give a score for how well the subject meets their requirements and the score from the user may be used, in addition to the metadata, as further training data to update the machine learning model. The machine learning model is optionally specific for a given user. The feedback learning may result in a machine learning model that better reflects the user and gives better subjects for that user. Furthermore, due to the feedback learning, the system may continuously improve and better adapt to changes in preferences of the user.

In step 603, the determined subject is output, e.g. either directly to the subject selection interface or for another use or to be stored for use later.

In other embodiments, the subject or subjects may be provided to the UX engine 12. Thus, the subject or subjects may be predetermined (e.g. manually selected). In this case, the subjects may need to be linked to features of the metadata in order to carry out the content recommendation process. That is, metadata (e.g. at least one feature of the metadata) are mapped to a subject or subjects (e.g. features of the subject or subject). This mapping may need to be carried out manually and provided to the system 1.

Since there may be many thousands (e.g. 38,000) features in the ontology, it would be unwieldy for a user to navigate to selected subjects of interest. Therefore, an automated clustering process is beneficial to produce higher level subjects that a user can select (subscribe to). Thus, a user may only need to navigate a smaller, manageable number of subjects to select of subscribe to. They may also be presented with content from a broader spectrum than if they were to pick a lower level feature in the metadata. Thus, they may be presented with more content that they are not familiar with (and are also likely to be interested) and so they may feel they are making better use of the content service provider system.

Figure 7:
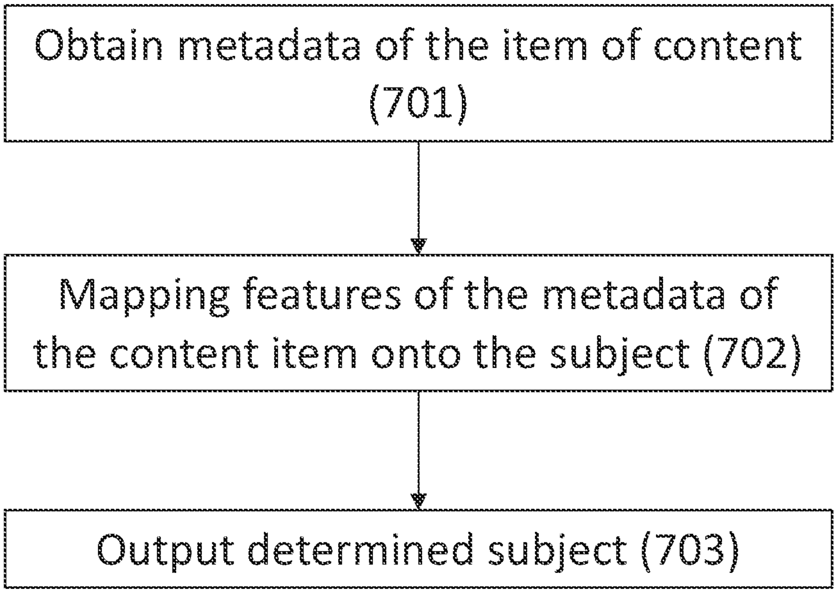
FIG. 7 is a flow chart of a method of identifying a subject from content.

FIG. 7 gives examples of methods of operation of the UX engine 12 to identify (e.g. automatically) a subject or subjects from an item of content of the items of content. It will be appreciated that, in other embodiments, this may be carried out in a separate module or sub-module to the UX engine 12.

In step 701, metadata is obtained concerning the item of content, the metadata representing at least some properties of the items of content.

In step 702, the metadata of the item of content is mapped onto the subject or subjects. In particular, the features of the metadata of the item of content are mapped onto the subject or subjects, the features of the metadata of the item of content having associated weights. That is, dependent on whether the features of the metadata of the content are in the subject, it is determined if the subject is in the content or not. The weights of the metadata may be used to determine how prevalent the subject is in the content (e.g. for determining the order with which content is recommended to the user).

In step 703, the identified/determined subject is output, e.g. either directly to the user subject selection interface or for another use or to be stored for use later.

In embodiments, a part or parts of content within an item of content may be defined. The part of content may be defined as being distinct from another part or parts of the content with respect to the subject. For example, the part of the content may have a subject that is not in the other part of the content. The part of the content may have a subject that is different from a subject in another part of the content. It may not be necessary for the subject in the other part of the content to be known in order to determine that a part of the content has a subject and should be defined as such. That is, the part of the content is defined as having a subject distinct from at least some of, or all of, the rest of the content.

The content recommendation engine (CRE) 22 may be configured to recommend the content item that contains the selected subject, i.e. the full content item which contains the selected subject. In embodiments, the content recommendation engine (CRE) 22 may be configured to recommend part of the content which contains the selected subject. That is, the part of the content which has been defined as being distinct from another part or parts of the content may be used such that only that part of the content is recommended. The content recommendation engine (CRE) 22 may index into the content at the start of the part of the content. It will be appreciated that a plurality of parts of content (e.g. from the same or different content) may be provided to the user. Thus, a user may be presented with a number of parts of content which are related to the subject they have selected and they do not need to view all of the item or items of content to see the part that interests them. For example, they may have selected the subject "Climate change" and they may then be presented with a news program or news programs, with indexing at the start of the section or sections of the news program or programs that reports on climate change. Similarly, for a book, they may only be presented with the page or pages relevant to the subject they have selected. For example, they may be presented with a recommendation to start reading the book at say, page 50, as this relates to climate change. This has advantages that a user is directly taken to content that interests them and they are less likely to switch off or stop viewing content as they do not need to go through content that is not of interest.

Figure 8:
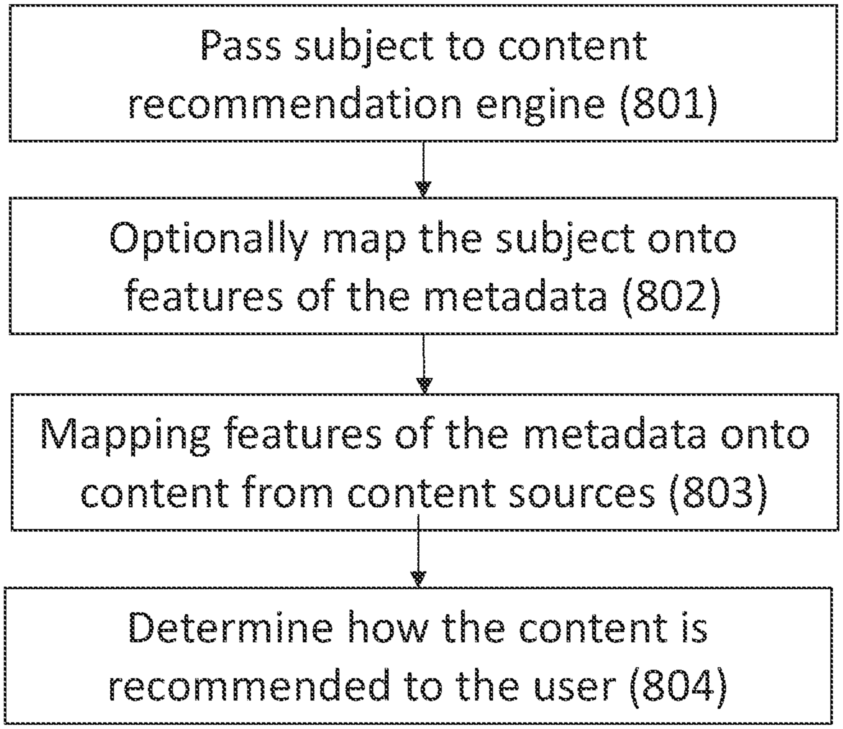
FIG. 8 is a flow chart of a method of generating content recommendations for the user.

FIG. 8 gives examples of methods of the content recommendation engine (CRE) 22 to generate content recommendations for the user.

In step 801, the subject selected by the user is passed to the content recommendation engine (CRE) 22 from the UX engine 12.

The content is then identified from the one or more content sources available to the user, the content including the selected subject.

In step 802, which may be optional, the subject may be mapped onto the features of the metadata. This may be optional as the subject may already be mapped onto features of the metadata, e.g. in the UX engine 12.

In step 803, the features of the metadata are mapped to the content available to the user from the content sources. These features of the metadata are related to the subject, e.g. in that the features of the metadata and the features of the subject may be the same. In other words, the features of the metadata may be in the subject. In some examples, the subject may be or have only a single feature in the metadata. In particular, the features of the subject are mapped onto the features of the metadata of the content available to the user from the content source or sources, the features of the content having associated weights. Dependent on whether the features of the subject are in the content, and the associated weights of the features of the metadata in the content, it is determined if the content includes the subject and should be recommended to the user or not (e.g. when compared to other items of content).

In step 804, a determination is made (e.g. automatically) on how the content is recommended to the user, e.g. which order to recommend content to the user.

In embodiments, the content recommendations may be separated by subject or may comprise content from all of the subjects (if more than one subject is selected) selected by the user.

In embodiments, the content recommendations may be ordered by how prevalent the subject is in the content. The prevalence of the subject in the content may be measured by at least one of: number of features from the subject included in the content, weight or rank associated with the feature(s) from the subject included in the content, and how often the feature(s) occurs in the subject. For example, if the content only includes one feature from the subject, it may be given a low prevalence. If the content includes lots of features from the subject, it may be given a high prevalence. The content items with the higher prevalence may be e.g. provided to the user first or may be more noticeable when they are provided (e.g. have the largest icon when shown on a display screen). As an example, if a first content item and a second content item both have features which are in the subject, then the weights of those features in the content may be taken into account to determine the order that the content would be recommended to the user. For example, if the subject and the first and second content items all include a feature, e.g. Tom Cruise, but the feature has a higher weight or rank in the first content item (as Tom Cruise is the main star) than the second content item (as Tom Cruise only has a cameo) then the first content item would be recommended first to the user (at least in the absence of other factors). It will be appreciated that, in practice, there may be many features that are common, or not, between content items and the subject or subjects. The system (automatically) determines, based on these factors, a suitable or optimal order in which the content items are recommended to the user.

In embodiments, the content recommendations may be ordered by personalization. For example, they may be ordered by using other preferences of the user. The other preferences may be included in the user profile of the user. As an example, the other preferences may include language (such as which language the user has been reading content in). In embodiments, the content recommendations may be ordered by popularity (e.g. based on what other users are watching or watched).

In embodiments, the content recommendations may be ordered by using other features of the metadata that are in the content which are in the selected subject. For example, if there are 2 features in a first item of content that are in a selected subject, and 3 features in a second item of content that are in the selected subject, then the second item of content may be first in the order recommended to the user as it has more features in the subject present.

In embodiments, the content recommendations may be ordered by date. This may provide an indication that the content is available for the user to view now or not so that a user does not get recommended with content that is not available to view. It will be appreciated that combinations may be made of more than one of these options when the content is being recommended. For example, there may be a combination of ordering by prevalence of the subject in the content and by personalization. In examples, when options are combined, one of the options may take preference over the other option or other options. It will be appreciated that there may be other options or ways in which the content recommendations may be ordered.

New content may be added to the content database of the content service provider. In embodiments, the system 1 (e.g. the content recommendation engine (CRE) 22) is configured to index new content with the selected subject such that it is recommendable to the user. This means that the metadata of the new content is obtained and is available for mapping with the features of the selected topic to determine if the selected topic is in the new content and/or if it should be recommended to the user. Furthermore, the system 1 (e.g. the content recommendation engine (CRE) 22) is configured to arrange the content recommendation process so that content that is no longer available to the user is not recommendable to the user. That is, only content that is available to the user is recommended to the user. Furthermore, this may comprise checking if content is available in the one or more content sources and only recommending content if available in the one or more content sources.

It will be appreciated that the content is not limited to a particular type of content, e.g. only video content. For example, the content may be any of e.g. video content (movies, TV shows, news, live sports, etc), audio (radio/music), books, games, article (e.g. news articles) etc.

It will be appreciated that, in embodiments, the system may provide a single subject or a plurality of subjects and the system may provide a single content recommendation or a plurality of content recommendations.

The system described herein can be used to provide subject selection interfaces that may in some examples allow a user to more quickly identify content of interest available from a content provider system. As content more likely to be of interest may be recommended in preference to content that is less likely to be of interest, then the user can more quickly identify content of interest.

The content provider system and/or system 1 may be configured such as to restrict or not allow access to personal information, or data that could be used to determine the name of a user, or demographic information concerning the user, by the system 1.

Although various specific examples have been described above, these are provided to help understanding of the present disclosure and other possible implementations can be used. For example, although specific arrangements of systems and networks that could be used to implement the concepts disclosed herein are shown in FIGS. 1 to 3, other systems architectures could be used. For example, the UX engine 12 could be provided as a stand-alone system rather than being integrated with the content recommendation engine (CRE) 22 or integrated into a content provider system rather than being provided as a separate intermediate or backend system.

Method steps described herein can be performed by one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customized circuitry. Processors suitable for the execution of a computer program include CPUs and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented with a user device 40 having a screen, e.g., a CRT (cathode ray tube), plasma, LED (light emitting diode) or LCD (liquid crystal display) monitor, for displaying information (e.g. the content selection interface 605) to the user and an input device, e.g., a keyboard, touch screen, a mouse, a trackball, and the like by which the user can provide input to the computer. Other kinds of devices can be used, for example, feedback provided to the user can be any form of sensory feedback, e.g., visual feedback, auditory feedback, or tactile feedback; and input from the user can be received in any form, including acoustic, speech, or tactile input.

As such, the above description of specific embodiments is made by way of example only. A skilled person will appreciate that variations of the described embodiments may be made without departing from the scope of the invention.

What is claimed is:

1. A computer-implemented method of providing one or more content item recommendations for a user of a content distribution system, the method comprising:

obtaining metadata concerning items of content, the metadata representing at least some properties of the items of content;

at least one of:

determining at least one subject based on the metadata by processing a plurality of features of the metadata and grouping these features into the at least one subject such that the at least one subject is higher level than the plurality of features of the metadata; and mapping a plurality of features of the metadata to at least one subject, wherein the at least one subject is predetermined, such that the at least one subject is higher level than the plurality of features of the metadata;

providing the at least one subject related to the metadata to be available to the user for selection;

using a selected subject selected by the user and metadata concerning content available from one or more content sources to generate at least one content item recommendation for the user, the one or more content sources having content available for the user to watch or otherwise consume, the one or more content sources having content available for the user to watch or otherwise consume, and providing the at least one content item recommendation to the user.

2. The method of claim 1, further comprising determining the at least one subject based on the metadata by:

applying a machine learning model to the plurality of features of the metadata, the machine learning model being configured to output the at least one subject based on the metadata.

3. The method of claim 1, wherein the metadata concerning the items of content is obtained from at least one of: the content, title, synopsis/short description, subtitles/closed caption text, full article text, other audio/visual data, textual data that has been converted from audio; and content that has at least one associated learn action for the user.

4. The method of claim 1, wherein the metadata concerning the items of content is obtained from a stored ontology that includes at least 10,000 features that can be used as metadata to represent items of content.

5. The method of claim 4, wherein the ontology includes enriched versions of metadata obtained for items of content.

6. The method of claim 1, wherein generating the at least one content recommendation comprises at least one of:

identifying content available from the one or more content sources that includes the selected subject;

mapping the at least one subject onto at least one feature of the metadata and then mapping the at least one feature of the metadata onto content available from the one or more content sources, and mapping the features of the at least one subject onto the features of the metadata of the content available from the one or more content sources, the features of the content having at least one associated weight.

7. The method of claim 1, further comprising identifying the at least one subject within an item of content of the items of content.

8. The method of claim 7, wherein identifying the at least one subject within an item of content of the items of content comprises at least one of:

mapping the metadata of the item of content onto the at least one subject;

mapping at least one feature of the metadata of the item of content onto at least one subject; and mapping the features of the metadata of the item of content onto the at least one subject, the features of the item of content having at least one associated weight.

9. The method of claim 1, further comprising defining at least one part of the content within an item of content of the items of content, wherein each part of the content is distinct from another part or parts of the content with respect to the subject.

10. The method of claim 9, wherein the at least one content recommendation is for at least one of: the full content item which contains the selected subject and at least one part of the content which contains the selected subject.

11. The method of claim 1, wherein the at least one subject is at least one of: a feature and/or faceted feature of the metadata and a feature and/or faceted feature from a subset of features and/or faceted features of the metadata.

12. The method of claim 1, wherein providing the at least one subject to be available to the user for selection comprises at least one of: providing the at least one subject for the user to subscribe to, providing a search function for the user to search for at least one subject and recommending at least one subject to the user.

13. The method of claim 12, wherein providing the search function comprises providing at least one of: a 'search by' function for searching by the at least one subject to find relevant content and 'navigate by' function for searching by the at least one subject to provide a plurality of further subjects related to the at least one subject.

14. The method of claim 12, wherein recommending at least one subject to the user is based on a user profile of the user and/or collaborative techniques.

15. The method of claim 1, further comprising generating a plurality of content item recommendations for the user and providing the plurality of content item recommendations to the user.

16. The method of claim 15, wherein the plurality of content recommendations are at least one of: separated by subject; comprising all of subjects selected by the user; ordered by how prevalent the subject is in the content; ordered by personalization; ordered by using other preferences of the user; ordered by popularity, ordered by using other features of the metadata that are in the content which are in the selected subject; and ordered by date.

17. The method of claim 1, further comprising indexing new content with the selected subject such that it is recommendable to the user and/or arranging content so that content that is no longer available to the user is not recommendable to the user.

18. A system comprising processing circuitry configured to:

obtain metadata concerning items of content, the metadata representing at least some properties of the items of content;

at least one of:

determine at least one subject based on the metadata by processing a plurality of features of the metadata and grouping these features into the at least one subject such that the at least one subject is higher level than the plurality of features of the metadata; and map a plurality of features of the metadata to at least one subject, wherein the at least one subject is predetermined, such that the at least one subject is higher level than the plurality of features of the metadata;

provide the at least one subject related to the metadata to be available to the user for selection;

use a selected subject selected by the user and metadata concerning content available from one or more content sources to generate at least one content item recommendation for the user, the one or more content sources having content available for the user to watch or otherwise consume, and provide the at least one content item recommendation to the user.

19. A non-transitory computer-readable medium that comprises computer-readable instructions that are executable to perform a method according to claim 1.

* * * * *